US008504719B2

(12) United States Patent
Swildens

(10) Patent No.: US 8,504,719 B2
(45) Date of Patent: *Aug. 6, 2013

(54) LOAD BALANCING ARRAY SYSTEM WITH URL MODIFICATION SO THAT CONTENT IS SERVED BY A CONTENT DELIVERY NETWORK

(75) Inventor: Eric Sven-Johan Swildens, Mountain View, CA (US)

(73) Assignee: Akamai Technologies, Inc., Cambridge, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/795,521

(22) Filed: Jun. 7, 2010

(65) Prior Publication Data

US 2010/0251008 A1    Sep. 30, 2010

Related U.S. Application Data

(63) Continuation of application No. 12/041,562, filed on Mar. 3, 2008, now Pat. No. 7,734,814, which is a continuation of application No. 09/779,071, filed on Feb. 7, 2001, now Pat. No. 7,340,532.

(60) Provisional application No. 60/188,142, filed on Mar. 10, 2000.

(51) Int. Cl.
*G06F 15/16* (2006.01)
*G06F 15/173* (2006.01)
*G06F 15/177* (2006.01)

(52) U.S. Cl.
USPC ........... 709/238; 709/203; 709/217; 709/241; 718/105

(58) Field of Classification Search
USPC ........... 709/217–228, 200–203, 238; 718/105
See application file for complete search history.

(56) References Cited

U.S. PATENT DOCUMENTS

| | | | | | |
|---|---|---|---|---|---|
| 5,774,660 | A | * | 6/1998 | Brendel et al. | 709/201 |
| 6,088,796 | A | * | 7/2000 | Cianfrocca et al. | 713/152 |
| 6,108,300 | A | * | 8/2000 | Coile et al. | 370/217 |
| 6,108,701 | A | * | 8/2000 | Davies et al. | 709/224 |
| 6,115,745 | A | * | 9/2000 | Berstis et al. | 709/227 |
| 6,173,311 | B1 | * | 1/2001 | Hassett et al. | 709/202 |
| 6,185,598 | B1 | | 2/2001 | Farber et al. | |
| 6,189,042 | B1 | * | 2/2001 | Keller-Tuberg | 709/238 |
| 6,289,382 | B1 | * | 9/2001 | Bowman-Amuah | 709/226 |
| 6,374,300 | B2 | * | 4/2002 | Masters | 709/229 |
| 6,389,448 | B1 | * | 5/2002 | Primak et al. | 718/105 |
| 6,505,254 | B1 | * | 1/2003 | Johnson et al. | 709/239 |
| 6,513,069 | B1 | * | 1/2003 | Abato et al. | 709/238 |
| 6,578,066 | B1 | * | 6/2003 | Logan et al. | 718/105 |
| 6,578,068 | B1 | * | 6/2003 | Bowman-Amuah | 709/203 |
| 6,606,708 | B1 | * | 8/2003 | Devine et al. | 726/8 |
| 6,611,861 | B1 | * | 8/2003 | Schairer et al. | 709/217 |
| 6,678,733 | B1 | * | 1/2004 | Brown et al. | 709/229 |

(Continued)

*Primary Examiner* — Haresh N Patel
(74) *Attorney, Agent, or Firm* — Joshua T. Matt

(57) ABSTRACT

A decrypting load balancing array system uses a Pentaflow approach to network traffic management that extends across an array of Decrypting Load Balancing Array (DLBA) servers sitting in front of back end Web servers. One of the DLBA servers acts as a scheduler for the array through which all incoming requests are routed. The scheduler routes and load balances the traffic to the other DLBA servers (including itself) in the array. Each DLBA server routes and load balances the incoming request packets to the appropriate back end Web servers. Responses to the requests from the back end Web servers are sent back to the DLBA server which forwards the response directly to the requesting client.

14 Claims, 9 Drawing Sheets

U.S. PATENT DOCUMENTS

| | | | |
|---|---|---|---|
| 6,691,165 B1 * | 2/2004 | Bruck et al. | 709/227 |
| 6,701,363 B1 * | 3/2004 | Chiu et al. | 709/224 |
| 6,760,775 B1 * | 7/2004 | Anerousis et al. | 709/238 |
| 6,799,177 B1 * | 9/2004 | Fai et al. | 709/217 |
| 6,801,949 B1 * | 10/2004 | Bruck et al. | 709/232 |
| 6,850,980 B1 * | 2/2005 | Gourlay | 709/226 |
| 6,954,777 B1 * | 10/2005 | Fields et al. | 709/203 |
| 7,055,173 B1 * | 5/2006 | Chaganty et al. | 726/11 |
| 7,340,532 B2 * | 3/2008 | Swildens | 709/238 |
| 7,734,814 B2 * | 6/2010 | Swildens | 709/238 |
| 2001/0032254 A1 * | 10/2001 | Hawkins | 709/219 |
| 2001/0047415 A1 * | 11/2001 | Skene et al. | 709/226 |
| 2001/0052024 A1 * | 12/2001 | Devarakonda et al. | 709/238 |
| 2002/0087913 A1 * | 7/2002 | Harper et al. | 714/15 |
| 2002/0103846 A1 * | 8/2002 | Zisapel et al. | 709/105 |
| 2003/0041263 A1 * | 2/2003 | Devine et al. | 713/201 |
| 2003/0191970 A1 * | 10/2003 | Devine et al. | 713/201 |
| 2004/0210670 A1 * | 10/2004 | Anerousis et al. | 709/238 |

* cited by examiner

| DLBA Server # | Last Access in Seconds |
|---|---|
| 2 | 19293 |
| 1 | 19294 |
| 2 | 99239 |
| 0 | 10203 |
| 1 | 2043 |
| 0 | 1034 |
| 1 | 1045 |

Fig. 4

| DLBA Server # | MAC Addr | Physical IP Addr | # IP Groups Assigned | Avg Resp Time | # Hits | # Open Conn | Failed | Enabled | Weight |
|---|---|---|---|---|---|---|---|---|---|
| 0 | 3E03E | 1.2.3.4 | 294 | 10ms | 41523 | 145 | 0 | 1 | 100 |
| 1 | 4C4DE | 1.2.3.5 | 284 | 14ms | 11234 | 153 | 0 | 1 | 90 |
| 2 | 5F6EC | 1.2.3.6 | 302 | 10ms | 41324 | 123 | 0 | 1 | 100 |

Fig. 5

| Web Server # | Physical IP Addr | Avg Resp Time | # Hits | # Open Conn | # Unable to Connects | Enabled | Weight |
|---|---|---|---|---|---|---|---|
| 0 | 2.2.3.4 | 10ms | 41523 | 145 | 0 | 1 | 100 |
| 1 | 3.2.3.5 | 14ms | 11234 | 153 | 0 | 1 | 90 |
| 2 | 4.2.3.6 | 10ms | 41324 | 123 | 0 | 1 | 100 |

Fig. 7

| Web Server # | Physical IP Addr | # Cookie Groups Assgnd | Avg Resp Time | Total # Hits | Total # Open Conn | Failed | Enabled | Weight |
|---|---|---|---|---|---|---|---|---|
| 0 | 2.2.3.4 | 294 | 10ms | 41523 | 145 | 0 | 1 | 100 |
| 1 | 3.2.3.5 | 284 | 14ms | 11234 | 153 | 0 | 1 | 90 |
| 2 | 4.2.3.6 | 302 | 10ms | 41324 | 123 | 0 | 1 | 100 |

Fig. 8

LOAD BALANCING ARRAY SYSTEM WITH URL MODIFICATION SO THAT CONTENT IS SERVED BY A CONTENT DELIVERY NETWORK

PRIORITY AND CROSS-REFERENCES TO RELATED APPLICATIONS

The present application is a Continuation of U.S. patent application Ser. No. 12/041,562, filed on Mar. 3, 2008 now issued as U.S. Pat. No. 7,734,814 B2, which is a Continuation of U.S. patent application Ser. No. 09/779,071, filed on Feb. 7, 2001, now issued as U.S. Pat. No. 7,340,532 B2, which claims priority to Provisional U.S. Application No. 60/188,142 filed on Mar. 10, 2000, the entire contents of which are incorporated herein by this reference. The applicants hereby rescind any disclaimer of claim of scope in the parent applications or the prosecution history thereof and advise the USPTO that the claims in this application may be broader than any claim in the parent applications.

BACKGROUND OF THE INVENTION

1. Technical Field

The invention relates to network traffic management in a computer environment. More particularly, the invention relates to load balancing and network traffic management among Web servers or caches in a computer environment.

2. Description of the Prior Art

Then are a number of load balancing and traffic management products available for performing load balancing/traffic management among a cluster of web servers. However, none have the ability to schedule both HTTP and HTTPS (SSL) traffic persistently based on user sessions (cookies or session identifiers in HTTP GET requests).

The majority of the approaches suffer from having a bottleneck because they require all traffic coming in and out of the cluster to go through a single machine. The single machine limits the amount of throughput available in the cluster.

Additionally, many approaches lack scheduling features that make efficient use of web server caches. None can fully utilize HTTP keepalive connections when performing URL based scheduling across multiple machines.

Further, none of the approaches are integrated with a global content delivery network and therefore cannot automatically determine when to use the content delivery network instead of the local cluster to deliver content.

The previous solutions to load balancing and traffic management are almost universally based on TCP/IP routing and by changing routes when servers fail. Routing can be performed based on the type of content or elements within content.

Load balancers come in two basic flavors. There are those where all traffic in and out of the site goes through a single box. This has "four way" data flow. Data flows in through a scheduler, then to a Web server, then back through the scheduler and out to the client.

There are also ones that have "triangular data flow." In these, the data flows through the scheduler, to a Web server and then back out to the Internet directly from the Web server.

The former solution does not require special software on the servers in the cluster. The latter solution requires special software on the server in the cluster. Because of this, both have advantages and disadvantages.

Triangular data flow has the advantage that the throughput of the system can be better since traffic going out doesn't go through the scheduler box. However, it is difficult to implement, maintain, and administer because of the requirement of putting software on each server that sends traffic directly out instead of going through the scheduler.

The four way data flow suffers from a throughput bottleneck, but isn't hard to implement because a box is placed in the network, configured, and it does its work. This approach does not require any software on the servers in the cluster.

Persistence is the ability to keep an individual user session tied to a single machine. Almost all load balancers have various policies for scheduling and maintaining persistence. All packets from the individual user will be sent to the machine that he is persistent with. That way, a machine can maintain the state of the user since the user is always scheduled to the same machine.

Most load balancing systems allow scheduling based on information about the client (IP address) or content contained in a request (cookie, content requests, etc.). However, since these systems are normally based on simple routing techniques, they tend to fail when it comes to dealing with requests that are encrypted since they do not have the ability to decrypt the request.

It would be advantageous to provide a decrypting load balancing array system that provides load balancing and network management across Web servers and bypasses the single server bottleneck in a computer network. It would further be advantageous to provide a decrypting load balancing array system that decrypts SSL requests and performs SSL session scheduling.

SUMMARY OF THE INVENTION

The invention provides a decrypting load balancing array system. The system provides load balancing and network management of traffic through a cluster of servers that avoids the typical single server bottleneck. In addition, the invention allows the decryption/encryption and session scheduling of SSL requests through independent load balancing servers.

A preferred embodiment of the invention uses a Pentaflow approach to network traffic management. Pentaflow extends across an array of Decrypting Load Balancing Array (DLBA) servers sitting in front of back end Web servers. One of the DLBA servers acts as a scheduler for the array. All incoming requests are routed through the scheduler.

The scheduler routes and load balances the traffic to the other DLBA servers (including itself) in the array. Each DLBA server routes and load balances the incoming request packets to the appropriate back end Web servers. Responses to the requests from the back end Web servers are sent back to the DLBA server which forwards the response directly to the requesting client.

Each DLBA server has the ability to decrypt SSL sessions in a distributed fashion and then schedule sessions to back end Web servers based on a cookie or session ID. SSL packets are decrypted in the DLBA server before being routed to a back end Web server. This allows the DLBA server to schedule SSL sessions to back end Web servers based on a cookie or session ID. Response packets are encrypted by the DLBA server before being forwarded to the client.

The invention also uses cookie injection to map a client to a specific back end Web server. In addition, any DLBA server in the array is capable of taking over the scheduler functionality in case of scheduler failure.

URL based scheduling and hash scheduling of request packets with keepalive connections is easily performed due to the invention's architecture.

Other aspects and advantages of the invention will become apparent from the following detailed description in combination with the accompanying drawings, illustrating, by way of example, the principles of the invention.

BRIEF DESCRIPTION OF THE DRAWINGS

FIG. 4 is a diagram of an example of a Client IP Hash Table according to the invention;

FIG. 5 is a diagram of an example of a DLBA Server Status Table according to the invention;

FIG. 7 is a diagram of an example of a Web Server Status Table according to the invention;

FIG. 8 is a diagram of an example of a Summary Web Server Status Table according to the invention.

DETAILED DESCRIPTION OF THE INVENTION

The invention is embodied in a decrypting load balancing array system in a computer environment. A system according to the invention provides load balancing and network management of traffic through a cluster of servers that avoids the typical single server bottleneck. In addition, the invention allows the decryption/encryption and session scheduling of SSL requests through independent load balancing servers.

The invention provides a Decrypting Load Balancing Array (DLBA) system. A DLBA system is a group of machines that operate in parallel to perform SSL decryption and HTTP load balancing for a group of back end Web servers. It supports session ID and cookie based persistence for both HTTPS and HTTP traffic to the back end Web servers.

A DLBA system can be used to replace existing LocalDirector, F5 BIG-IP, Resonate CentralDispatch, etc. hardware and software. The DLBA system also performs decryption, removing the need for customers to set up or deploy servers or hardware to support SSL.

High-Level Benefits of the DLBA

Some of the features of the DLBA are as follows:

Single virtual IP address for many Web servers.

Pentaflow—5 way pipelined data flow.

Cookie based persistence/session id scheduling for both HTTPS (SSL) and HTTP.

URL based scheduling (including hash scheduling) with keepalive support.

Fully redundant schedulers for scheduler failure protection.

Unique hash group based persistence tables to keep persistence tables manageable.

The first item is supported by all local load balancers. All load balancers publish a Virtual IP (VIP) address to the world and then have many machines which can take traffic for that IP address.

Figure 1:
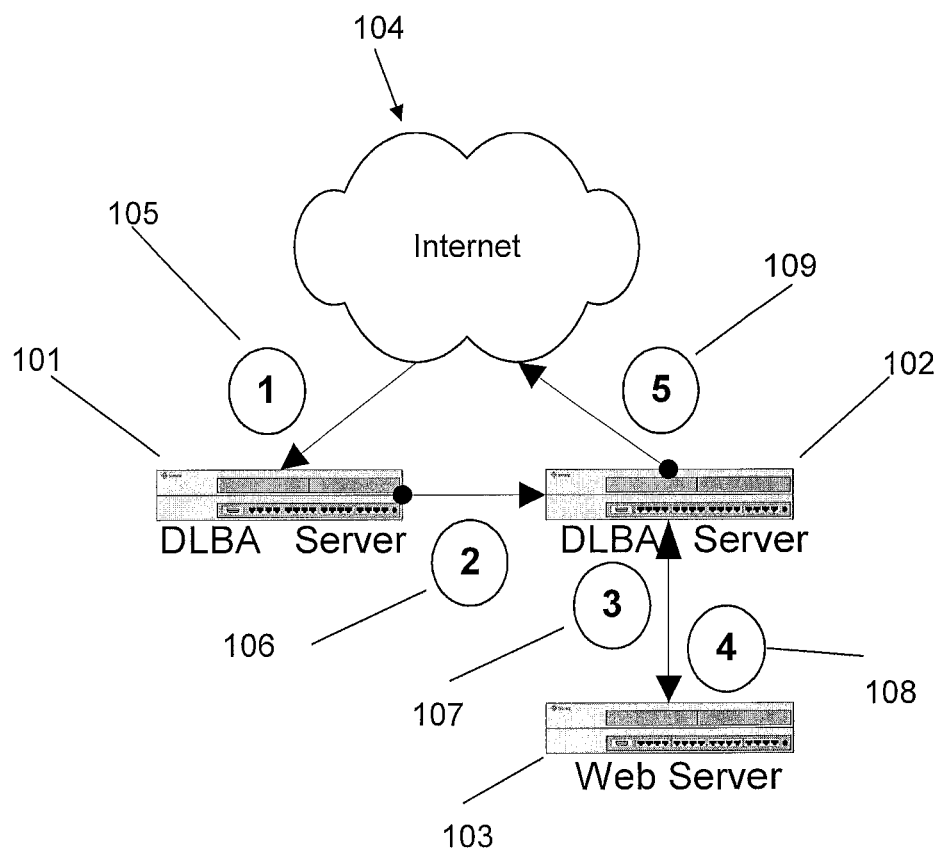
FIG. 1 is a block schematic diagram of a preferred embodiment of the invention's Pentaflow packet flow according to the invention.

Referring to FIG. 1, the Pentaflow feature is shown. The five-way pipelined data flow is a unique feature of the invention. What Pentaflow does is cause the flow of traffic coming from a client across the Internet or network 104 to be scheduled 105 to a DLBA server A 101, DLBA server A 101 schedules the traffic 106 to DLBA server B 102. DLBA server B 102 load balances traffic 107 to Web server C 103. Web server C 103 responds 108 back to DLBA server B 102, which sends the response 109 back to the client 104.

Pentaflow causes traffic in and out of the system to go through different machines. All traffic coming into the system will come in via route 1 105. However from route 1 105, the traffic could be scheduled to any DLBA server in the cluster. In FIG. 1 only one other DLBA server 102 is shown but, in practice, there will be an array of DLBA servers to which traffic may be scheduled to any one server. Here, the DLBA server 102 that the traffic is scheduled to makes a load balancing decision to decide which back end Web server to communicate with. It then communicates with the Web server 103 and returns a response to the client.

The invention can scale to almost any amount of throughput. The only limitation is the scheduler's ability to handle incoming traffic. Outgoing traffic is balanced among many DLBA servers. The servers utilize the full bandwidth possible for their connections because there is no bottleneck in the array. Each individual server passes connections through the switch at the maximum possible bandwidth.

In Cisco's LocalDirector, F5's BIG-IP, and many other load balancing solutions, all traffic in and out of the site is routed through a single box. That single box that all of the traffic goes through quickly becomes the bottleneck to the entire system.

Resonate's approach uses triangular data flow, where all traffic coming into the site goes through one box then gets scheduled to a server which responds to the client. This approach requires kernel and application level software on each of the Web server boxes to operate. The additional software causes the system to be prone to failures, to interfere with the operation of the Web server, and to be difficult to manage.

Pentaflow has the advantage that incoming and outgoing traffic takes different paths and does not require any modifications to the Web servers where the traffic is sent.

The cookie and session ID based persistence for HTTPS and HTTP is a major advantage of the invention that no other load balancing solution has. Because the invention uses Pentaflow, the system is able to decrypt SSL sessions in a distributed fashion and then schedule sessions to back end Web servers based on a cookie or session ID.

Other load balancers support cookie based persistence (with their own method of scheduling) for HTTP but not for SSL. The reason that other load balancers cannot support cookie based persistence for SSL is that they cannot decrypt the SSL session because they only have one scheduling box in the incoming path of traffic.

Because of Pentaflow, the scheduling of incoming traffic is distributed across an array of boxes, allowing the DLBA to perform decryption in a distributed fashion. This feature is critical to e-commerce sites. It allows them to always schedule based on cookie/session ID regardless of the protocol a user is using to connect to the site and regardless of whether the user's IP changes during the session. The user will always be scheduled to the same machine. No other existing single solution can provide this.

The DLBA also allows URL based scheduling, including hash scheduling, for scheduling URL requests to caches where a single connection can be scheduling to multiple back end machines and a keep-alive connection with the client can still be maintained. Many load balancers currently support basic URL based scheduling with their scheduling algorithms—DLBA URL based scheduling is different.

A DLBA server establishes a connection with a client and the client keeps a connection alive with the DLBA server. When requests come in, the DLBA server schedules the requests to different back end Web servers via different connections and replies to the client using a single connection.

No other load balancer can support this because they do not maintain a separate connection with the client. To perform URL based scheduling using these approaches, keep-alive support must be turned off on all the load balancing servers. Some servers (e.g., Microsoft IIS) do not support turning off keep-alive with HTTP connections, thereby causing their URL based scheduling to fail.

Another advantage of the DLBA is that schedulers are fully redundant in case of failure. Any one of the boxes in the array can become a scheduler at any time in case the main scheduler fails. The scheduler is basically a simple router that persistently maps requests based on an internal table. Also, the scheduler boxes can also be DLBA servers and can schedule connections to themselves. The invention is different from many of the other load balancers where two load balancing boxes are purchased and one box just sits idle and only becomes active when the other fails. In a DLBA system, as long as a machine is functioning, it will actively server some function in the array.

The DLBA server maintains persistent connections in all its paths when required and a special algorithm, hash group based persistence, is used to keep the tables small and manageable. Without this feature, persistence tables would get huge, failover could not perform predictably, and more connections would make the system less manageable. The hash group based persistence allows the system to handle any amount of traffic and the tables do not need to grow when the traffic grows, preventing them from becoming a bottleneck in the system.

Summary of Advantages

The DLBA supports any of the functionality supported by any other load balancer but also has major feature advantages over other load balancers. Because of the Pentaflow architecture and despite all of its added features, the system gains more throughput as more DLBA servers are added.

This is an attractive model to a company that sells product because, instead of a customer buying a single box, the customer will buy more boxes as their traffic increases. The customer will see the value in purchasing additional boxes.

In the future, the scheduler functionality could be burned into a router or switch for the highest routing performance and the DLBA servers themselves could become blades in a large router.

Because the system can parse traffic on the way out, "speederizing" content could be performed by the DLBA servers. URLs are rewritten so that they can be delivered via a content delivery network instead of all of the traffic being routed to a single Web server. The servers sample a portion of traffic, determine what content would be best served by changing their URLs to serve them from the Speedera Content Delivery Network and then change the URLs dynamically on the way out. The HTML page which was speederized could also be cached, if it is static, to gain higher performance so it did not need to be parsed each time on the way out. Additionally, client information can be added to the Speedera domain name to give the Speedera DNS tier information about the exact client machine making the DNS request.

These are just some of the features the invention could add to the system because it controls the entire flow of traffic from the DNS level to the HTTP delivery level and is able to parse or change things in any way along the flow.

DLBA Scheduler Architecture

All traffic into the array comes in through a box known as the DLBA scheduler. The DLBA scheduler is a DLBA server that has ARPed for the VIP address.

Figure 2:
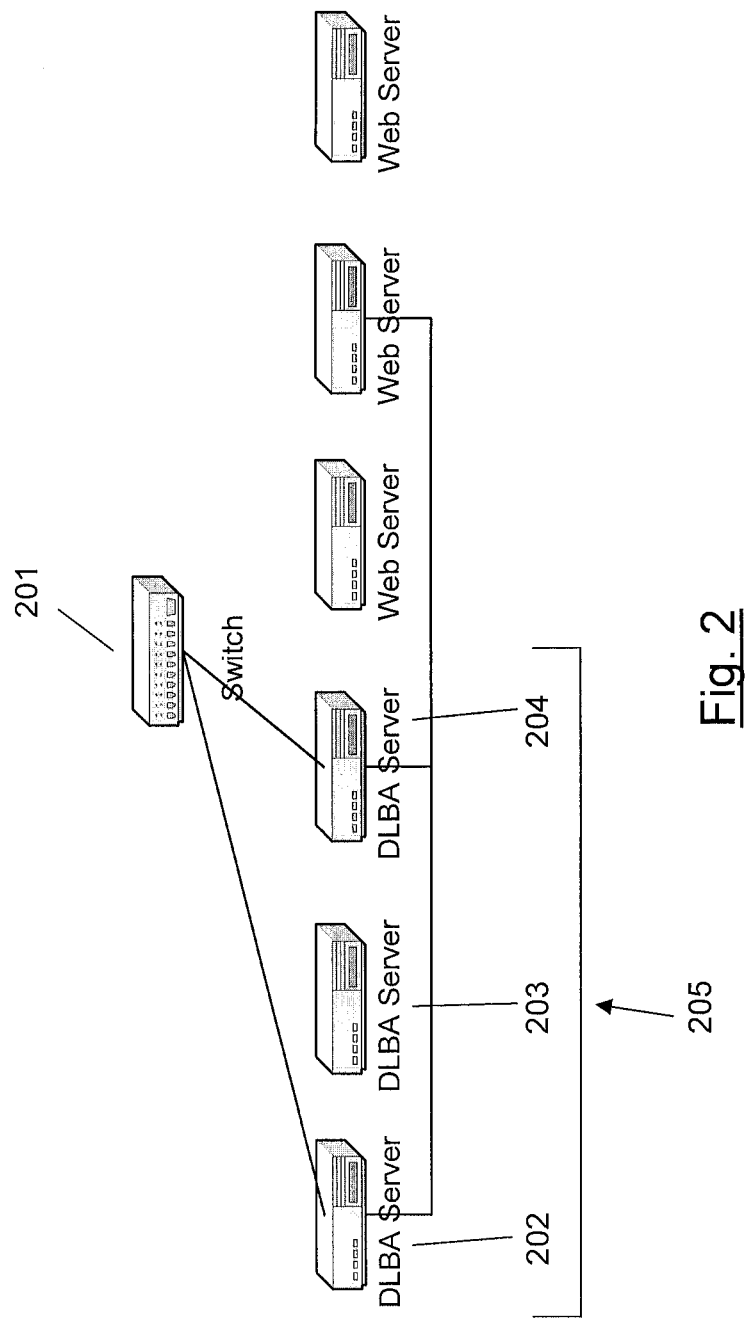
FIG. 2 is a block schematic diagram of an example of a preferred embodiment of the invention's Decrypting Load Balancing Array cluster according to the invention.

With respect to FIG. 2, all DLBA servers 202, 203, 204 in the array 205 have the VIP address assigned on a loopback interface (or Ethernet alias if possible), but only one machine in the cluster 205 ARPs for the VIP, causing the switch 201 to send all traffic for the VIP to that machine. All machines have the VIP address on an interface (loopback or physical) so they can send traffic back out to the client from the VIP address and so they can take over as the scheduler in case of a scheduler failure. Any machine in the cluster 205 has the ability to become a scheduler at any time in case the current scheduler fails.

The job of the DLBA scheduler is to route/load balance incoming traffic among the DLBA servers in the cluster in a persistent manner. It does this using routing by changing the incoming packet's MAC address to another machine in the cluster and then forwarding the packet, unchanged, back out through the switch. In this vein, the DLBA scheduler is, essentially, a router.

The scheduler may also simply process the packet itself instead of forwarding it out to another machine in the cluster if the load balancing decision determines that the scheduler machine itself is the best machine to process the connection.

The scheduler machine does not perform the three way handshake with the client, it simply forwards on all incoming packets to itself or another DLBA server in the cluster for processing. Those machines will respond directly back to the client. In this way, all traffic coming into the site comes in through the scheduler and all traffic going out is load balanced among the DLBA servers in the cluster.

FIG. 2 depicts what Pentaflow scheduling looks like physically with a DLBA array 205. The DLBA scheduler is the DLBA server 202 since all incoming traffic to the array 205 comes in through that server.

Figure 3:
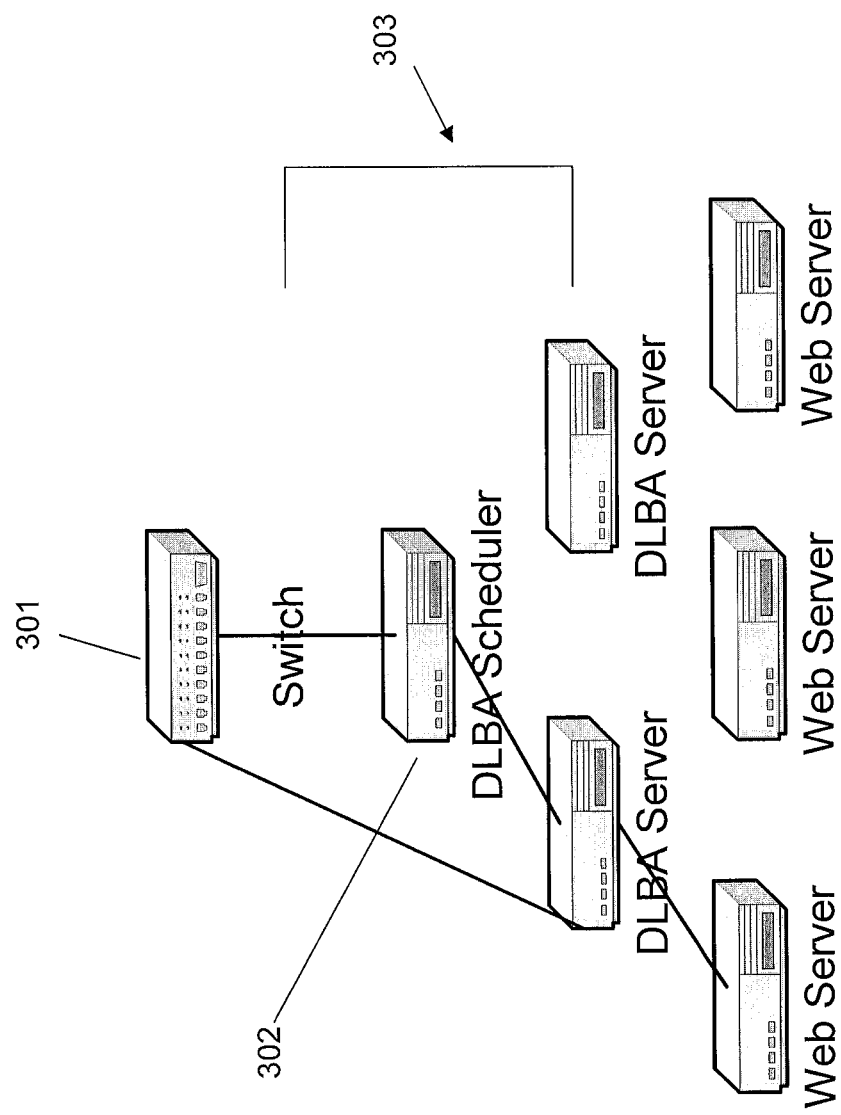
FIG. 3 is a block schematic diagram of a logical viewpoint of a preferred embodiment of the invention's Decrypting Load Balancing Array cluster according to the invention.

Referring to FIG. 3, a more logical Pentaflow DLBA array diagram is shown. FIG. 3 shows the same array configuration as FIG. 2, but more clearly shows the relationship of the DLBA scheduler 302 to the other machines in the array 303. The switch 301 sits logically above the array 303. All traffic goes through the DLBA scheduler 302 which routes and load balances traffic throughout the array 303.

Configuration

Configuration of the DLBA scheduler is done via a configuration file. The configuration file is pushed to the scheduler via a remote or local configuration program.

If the DLBA scheduler code is kernel code, it may be necessary to read the configuration file in user space and use an ioctl( ) to set values in the kernel for scheduling. Since the DLBA scheduler code should be fairly straightforward, a single ioctl( ) should suffice.

Internal Operation

Internally, the DLBA scheduler is essentially a router. Packets come in and the scheduler routes them by changing the MAC address of the packets and forwards the packets. With respect to FIG. 4, packets are forwarded according to a Client IP/Port to DLBA Server Hash Table 401.

Figure 4:
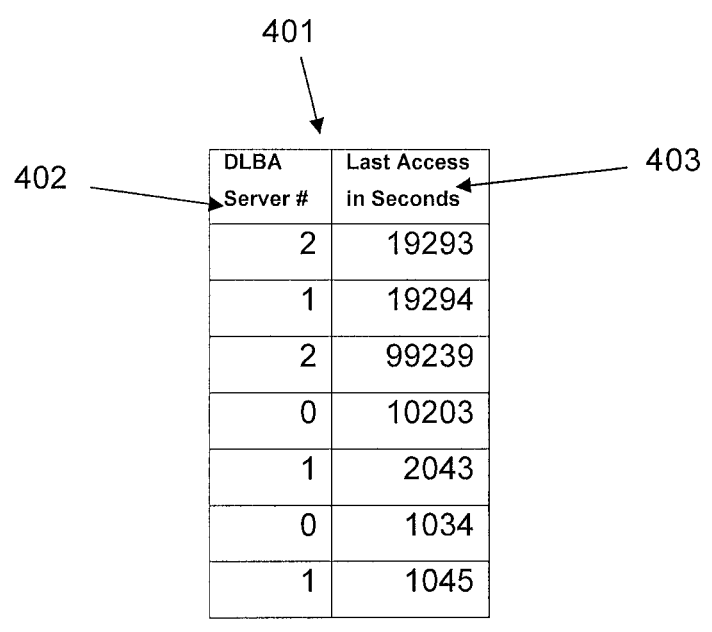

Referring to FIGS. 4 and 5 when the DLBA Server number 402 is found, the scheduler can consult the DLBA Server Status Table 501 to find the MAC address 502 it should route the packet to.

When a packet comes in, the Client IP and ephemeral port of the packet are hashed to a bucket in the Client IP/Port to DLBA Server Hash Table 401. The table contains the DLBA server number 402 to route the connection to. The size of the hash table is configurable but typically only at the time the array is started. It normally is not changed on a running cluster.

The incoming client IP and ephemeral port could be hashed as simply as this:

$$\text{bucket}=(32 \text{ bit client IP address}+16 \text{ bit client port}) \% \text{ size of hash table}$$

How does the Client IP Hash Table get filled? Initially, the hash table is empty with a unsigned −1 set for each DLBA server #. When a client connection comes in, if the DLBA server number it hashes to is −1, a load balancing decision will need to be made. The DLBA Server Status table is consulted to determine which DLBA server is best suited to receive the new connection. This can be as simple as finding the machine with the lowest # IP Groups assigned.

Referring again to FIGS. 4 and 5, the # IP Groups Assigned column 503 in the DLBA Server Status Table 501 shows how many IP groups (hash entries) have been assigned to this server. To evenly distribute traffic, each time the server is added as an entry into the Client IP Table 401, the # IP Groups 503 assigned value for that server should be incremented. The weight 511 can also be used to determine how many IP groups should be assigned to a server as well as the number of hits 505 or # open connections 506.

When a DLBA server fails, the scheduler should assign all entries in the Client IP table that map to that server to unsigned −1. This will cause the system to route around the failed box and assign new servers to the failed connections in a load balanced manner.

Entries in the Client IP Hash Table cannot simply be reassigned to a server when it is added to the cluster. This is because there may be active connections that are getting routed and changing an entry in the table will cause the session to break.

Instead, it is best to wait until buckets are unused and when they become unused, reassign them to the new server. Using this method, new servers gradually enter the cluster.

With respect to FIG. 4, to determine when entries become unused, each entry in the Client IP Hash Table 401 has a Last Access in Seconds column 403. This is the time of the last access to the hash entry in seconds. Each time a packet comes into the scheduler and it hashes to a bucket, the bucket's Last Access in Seconds is updated to reflect the current time.

If the scheduler hashes to a bucket with a very old last access time, it can reassign the bucket to a new server and make load balancing decisions. This is how new DLBA servers added to the cluster get assigned hash entries in the table. The amount of time that it takes for an entry to timeout before it is reassigned is configurable in the configuration file.

Referring again to FIG. 5, the DLBA Server Status Table 501 has a number of columns that need to be kept up to date on a running system. For example, the Avg. Resp. Time (average response time) 504, number of hits 505, number of open connections 506, and failed 507 columns.

A status daemon runs on each DLBA server machine. The DLBA scheduler communicates with each status daemon via TCP/IP to get status information. The scheduler does not connect to all of the servers at once, instead it loops through the list of servers, communicating with each one, closing the connection after each one responds. Any server that it cannot communicate with after a configurable number of retries is considered failed. There is a configurable delay after the status sweep of the DLBA servers in the array. The time of the last sweep is available for remote monitoring to determine how stale the status data is in the table.

The DLBA Server Number 508, MAC Address 502, Physical IP Address 509, Enabled 510, and Weight 511 columns come from the configuration file.

Scheduler Failover

A failover daemon runs on each DLBA server machine and its job is to contact the scheduler at a regular interval to obtain a current client IP table and to see if the scheduler has failed. It determines failure of the scheduler by a simple ping test to the box to determine if the kernel is running properly. If the ping succeeds, the kernel is running and it is assumed that the machine is running. It does not use whether the current client IP table could be obtained as a determination of whether the scheduler is up since that may be prone to failure itself.

The client IP table can have a version number on the scheduler and on each server so the whole table does not need to be sent at each interval if it has not changed. Only the server numbers to hash buckets needs to be versioned and synchronized across the machines, the last access times do not need to be. When failover occurs, the last access time is set to the current time for all entries in the table.

The DLBA Server Status Table does not need to be synchronized since it is created from the configuration file and each DLBA server is pushed the configuration file during configuration. The dynamic columns of the DLBA Server Status Table do not relate to existing sessions in process.

A DLBA server determines the active scheduler by checking its ARP table for the VIP address. The ARP table contains the MAC address of the current scheduler. If that scheduler is determined to be down by the failover daemon, then the DLBA server ARPs for the VIP.

A number of machines could ARP for the VIP at the same time but only one of them will end up with the VIP address. As soon as a new scheduler is chosen, the failover daemon tests will no longer fail and the system will have chosen a new scheduler. Decoupling the determination of the scheduler from the actual determinator (who has ARPed for the VIP) is tricky to synchronize. It may be necessary for a potential scheduler to contact all machines to make sure they don't want to become the active scheduler. If a potential scheduler contacts another potential scheduler that thought it should be the scheduler, they could determine who should be the scheduler by simply comparing their physical IP address (or other static quantity that is different between machines) and whichever machine's is larger will become the active scheduler.

A ping test is used to determine if a scheduler is running to help avoid an ARP war. If two machines have failover/synchronization daemons that can't communicate with whatever status method is used, they could end up fighting over who is the active scheduler for a cluster. If a method other than ping is used, that method could fail and both methods would fight with ARPs. Using ping is a pretty safe method in that if it doesn't work, the machine isn't around but the ping check itself is not prone to failure.

Panic Mode

A "panic mode" can be used in the system that will evenly distribute the Client IP hash table among all servers in the cluster in case a meltdown occurs and the table becomes messed up for whatever reason. This will break all existing sessions but will quickly bring the system back to a normal state.

Using the Panic Mode clears the dynamic fields in the DLBA Server Status table to their defaults (the configuration file defaults) and sets the current scheduling box statically until the problem can be diagnosed and repaired.

Monitoring

An ioctl( ) is used to dump the DLBA server Status table and to dump the Client IP Hash table. A daemon is written that performs the ioctl( ) and writes it to the socket read-only. This can be connected to a user-interface.

Prototype

A prototype of the scheduler can be developed without DLBA servers. The prototype is similar to a standard TCP/IP routing based NAT load balancer. If Web servers are run on each machine instead of DLBA servers, the scheduler routes traffic to the servers and they respond directly to the client. When the Web servers fail, the scheduler routes around them. When the scheduler fails, another box picks up as the scheduler.

DLBA Server Architecture

Figure 6:
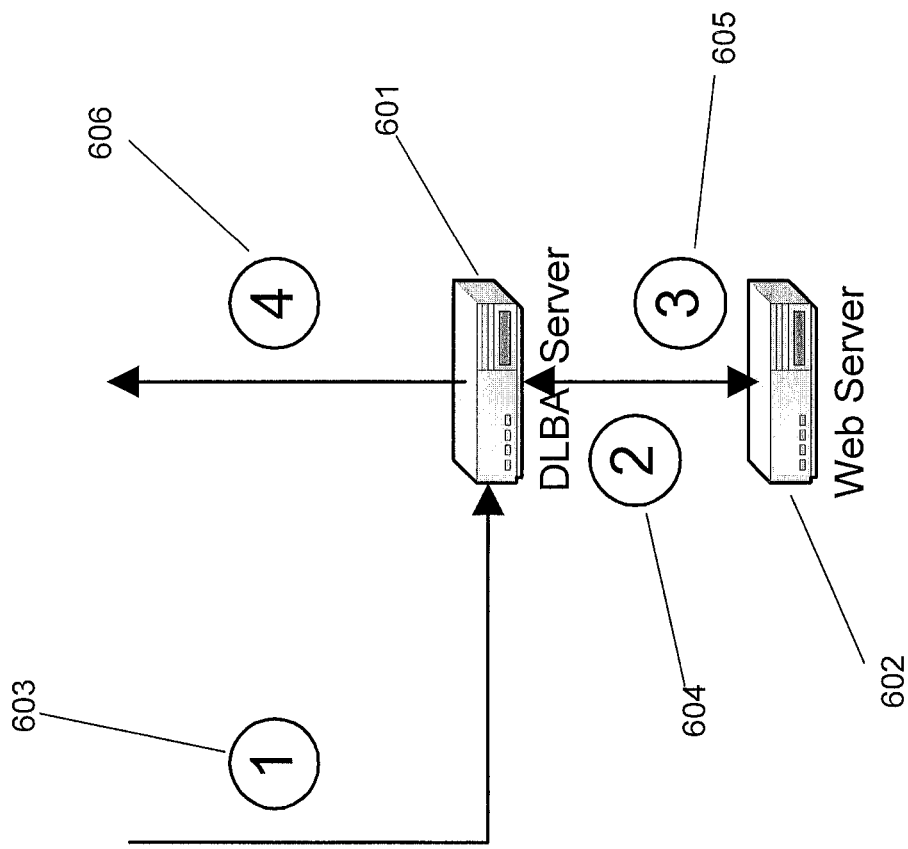
FIG. 6 is a block schematic diagram of a DLBA server interface according to the invention.

With respect to FIG. 6, a DLBA server 601 is essentially a proxy Web server. It is a standard application level Web server that takes requests from clients 603 and forwards them 604 to back end Web servers 602. The DLBA server 601 processes the replies 605 from the back end Web servers 602 and sends the response directly back to the client 606.

If incoming requests are SSL, the DLBA server 601 performs the key exchange and decrypts the request before forwarding it to the back end Web servers 602. The DLBA server 601 will also encrypt the response on the way out 606 for SSL sessions.

The view of a DLBA server is that it accepts incoming connections to the VIP, processes them, and returns a reply from a source of the VIP. Packets to a DLBA server are routed by a DLBA scheduler. However, the DLBA proxy Web server process does not know that.

The DLBA server Web process generally listens to ports 80 and 443 on the VIP address. When requests come in, the server simply connect( ) with the client and then reads the request. It processes the requests by opening a socket to the back end Web server and forwards the request to the back end.

The DLBA server then reads the reply from the back end and writes a packet to the client whenever it reads a packet from the back end Web server. The traffic simply flows through the DLBA server on the way out. On the way in, the request must be read, up until the end of each request (there may be multiple requests if the incoming session is kept alive), before a connection is opened to the back end Web servers. However, the reply is processed as it is read. For a given session, one packet is read and written before the next packet is written to reduce the amount of buffering required by the DLBA server.

The connection to the back end Web servers does not need to be kept alive but the connection to the client does (if the client supports keep alive connections). In fact, it is better to not keep the back end connection alive, not for performance, but to allow for advanced scheduling. Where this can become useful is if the DLBA server performs URL hash based or other URL parsing to schedule requests.

Consider, for example, the case in which the DLBA server was a load balancer for a set of Web caches. An individual client might request a.html, b.gif, and c.gif—three elements that would constitute a full Web page. If the DLBA server was using URL hashing to spread content requests consistently to back end Web caches (to keep each cache "hot"), the three items would exist on different machines.

For example, when the DLBA server keeps a keep alive connection to the client, it will:
read the first request for a.html
hash a.html to a back end Web cache
open a socket and read a.html from the back end, writing it to the client as it reads it
close the socket to the back end Web cache
hash b.gif to a back end Web cache
open a socket and read b.gif from the back end, writing it to the client as it reads it
close the socket to the back end Web cache
hash c.gif to a back end Web cache
open a socket and read c.gif from the back end, writing it to the client as it reads it
close the socket to the back end Web cache Notice that the connection to the client is kept alive through the whole process even though three socket connections to the back end were performed.

Since the connections to the back end are all through a switch, performance across them is extremely high. Keeping the connection alive to the client reduces the number of packets on the Internet, thereby increasing the end user performance.

The DLBA server parses incoming requests and schedules them based on a scheduling algorithm. The two most popular algorithms are probably cookie/session id based scheduling and URL based scheduling. Cookie based scheduling will persistently map an individual user to a back end Web server regardless of whether they are using SSL or HTTP. The back end Web server only sees HTTP traffic because the DLBA server performs decryption.

The most common URL based scheduling is hash based scheduling with either a consistent hash or a binary list that has the properties of a consistent hash. This is used when the system is a front end to an array of Web caches. The cookie/session ID based scheduling is used when the system is a front end to a set of application Web servers that keep state information based on a user's cookie.

Configuration

Configuration of a DLBA server is performed by the same process as the configuration of a DLBA scheduler is performed. There is a single configuration file that is in the same format as the network configuration file. The same software is used to push and commit new configuration files to all DLBA servers in the array (including the DLBA scheduler).

Internal Operation

Internally, the DLBA server scheduler is essentially a proxy Web server. It schedules requests to back end Web servers either by looking at a cookie value or session ID in an HTTP get request or by hashing the incoming URL to a Web server number.

If the URL hash is used, then no state table needs to be maintained since the hash can simply hash to the number of back end Web servers. If the number of back end Web servers changes, then the hash will hash to different boxes, but if they are caches, the caches will simply reorganize. A consistent hash or something that has the properties of a consistent hash (without using the consistent hash algorithm) should be used for URL hash based scheduling so when servers are added and removed the caches stay as "hot" as possible.

When cookie scheduling is used, no state table needs to be maintained because the system uses an approach that keeps server mapping on the client side. This is called "cookie injection".

Cookie Injection

When cookie/session ID scheduling is implemented, cookie injection is used to map a user to a specific machine in the cluster. This is a novel feature of the DLBA.

If persistent cookie scheduling is enabled, the DLBA servers scan the headers of outgoing requests from the Web caches looking for the Set-Cookie header item that is issued by the Web server to initiate a session. The specific cookie name that starts a session is configurable.

When the DLBA server sees a Web server initiate a Set-Cookie request, it injects another additional name/value pair into that set cookie that identifies the server that the Set-Cookie came from. For example, something like "SpServer=10" is injected as an additional cookie name/value pair in the Set-Cookie response to the client.

This additional cookie has the same expiration time as the session identifier so persistence will be maintained as long as the session is maintained.

When requests come in, the DLBA server looks for the SpServer cookie. If the DLBA server finds the cookie, it will schedule to the server identified by the cookie value. Each server can have a unique integer key, defined in the configuration file, that the cookie value maps to.

Reviewing the process again, the DLBA server scans incoming requests for a SpServer cookie. If it finds one, it looks at the value and schedules the request to the machine represented by the value. The DLBA server scans headers from Web server responses for a Set-Cookie that is creating a cookie to start a session. When it finds one, it injects a SpServer cookie into the Set-Cookie reply with the same attributes as the session.

The name of the cookie the system injects should be configurable in the configuration file.

By storing the cookie-to-server mapping on the client, the DLBA servers do not have to maintain a table that maps cookies to back end Web servers. Also, since the mapping has the same expiration as the session, there isn't a problem where the mapping will go away or last longer than the session identifier will.

Status Tables

Referring to FIG. 7, each DLBA server maintains a server status table 701 of all the back end Web servers. This table 701 contains various statistics about the back end Web servers it is connecting to such as the Physical IP Address 702, Avg. Resp. Time 703, Number of Hits 704, and Number of Open Connections 705.

When a DLBA server tries to connect to a back end Web server and can't connect, it will reroute the request to another machine. So, none of the servers need to actively probe the back end Web servers, when they can't schedule a connection, that's considered a failure and they can reroute the connection at that time.

The DLBA scheduler maintains an overall statistics table for the cluster by connection to each DLBA server, getting its status table and adding its status to an overall status stable.

With respect to FIG. 8, the Summary Web Server Status Table 801 is maintained by the active DLBA scheduler. The Summary Status Table 801 does not need to be synchronized across machines since it is just for monitoring and not for scheduling. The monitoring information includes the Physical IP Address 802, Number of Cookie Groups Assigned 803, Total Number of Hits 804, and Total Number of Open Connections 805.

Using cookie injection removes the previous complications of what happens when a server is added. When a server is added to the cluster, cookies will just be injected with that new machine's identifier and the system doesn't have to worry about cookie hash groups or synchronizing state across machines, etc.

DLBA servers are able to load balance incoming requests to the back end Web servers in an intelligent fashion (open connections, machine load, SNMP information, response time) to distribute user sessions among the back end Web server machines.

The DLBA servers should have the ability to perform SSL encryption and decryption in hardware (using ncipher or rainbow cards) to accelerate the encryption/decryption process.

Monitoring

Each DLBA server will be running a daemon that has a socket open that dumps the state information of the tables used for scheduling and status. This can be the same daemon that the DLBA scheduler uses to dump its state information and the information dumped by the DLBA server should be in the same format as the DLBA scheduler data.

Task Description

Figure 9:
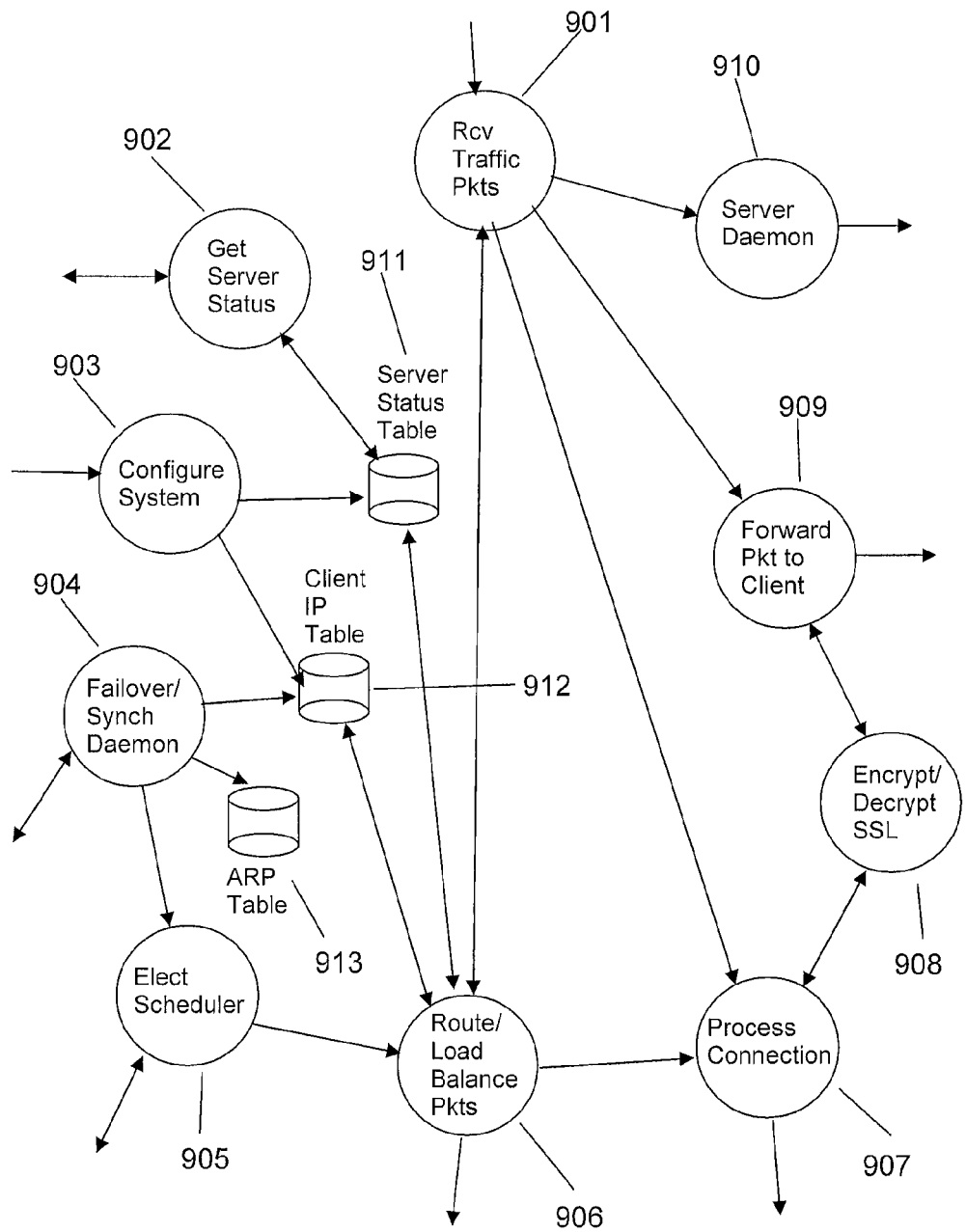
FIG. 9 is a block schematic diagram of a task-level viewpoint of a preferred embodiment of the invention according to the invention.

Referring to FIG. 9, the Rcv Traffic Pkts module 901 receives incoming traffic packets into the DLBA scheduler or server. The Rcv Traffic Pkts module distributes the packets depending on whether the destination of the packets are to a server or a client (response) and whether the DLBA server is also the scheduler.

If the DLBA server is also the scheduler, packets destined for a Web server are routed through the Route/Load Balance Pkts module 906. The Route/Load Balance Pkts module 906 performs the routing and load balancing of the packets to the DLBA servers (including itself) in the array using the Client IP Hash Table 912. The Route/Load balance Pkts module 906 uses the Server Status Table 911 to determine the MAC address to route the packet(s) to, as previously described.

The Configure System module 903 accepts pushed configuration information which is used to establish the Client IP Hash Table 912 and Server Status Table 911.

Server status is obtained by the Get Server Status module 902 which updates the Server Status Table 912 on the acting scheduler. On the server side, the status of the resident server is sent to the inquiring scheduler via its Server Daemon 910.

The Failover/Synch Daemon 904, as described above, periodically checks with the scheduler to determine if the scheduler is still alive. It determines the active scheduler by checking the ARP Table 913 for the MAC address of the scheduler. When the scheduler fails, the determination of which server becomes the new scheduler is taken upon by the Elect Scheduler module 905. The Elect Scheduler modules of the servers in the array negotiate to become the new scheduler.

In the role of server, packets from the RCV Traffic Pkts module 901 are processed by the Process Connection module 907. The Process Connection module 907 takes the requests, routed by the scheduler, from clients and forwards them to back end Web servers. SSL requests are decrypted by the the Encrypt/Decrypt SSL module 908 before forwarding the requests to back end Web servers.

Responses from the Web server come in through the Rcv Traffic Pkts module 901 and are sent to the Forward Pkt to Client module 909. The Forward Pkt to Client module 909 forwards the responses directly to the client. SSL responses are encrypted by the Encrypt/Decrypt SSL module 908 before the response is sent directly to the client by the Forward Pkt to Client module 909.

Although the invention is described herein with reference to the preferred embodiment, one skilled in the art will readily appreciate that other applications may be substituted for those set forth herein without departing from the spirit and scope of the present invention. Accordingly, the invention should only be limited by the Claims included below.

The invention claimed is:

1. A method for routing packets through a load balancing array of servers across a network in a computer environment, comprising:

in response to receiving a request packet from a requesting client via an IP address at a scheduler among a load balancing array of servers, the scheduler routing and load balancing the request packet to a load balancing server among the load balancing array of servers;

in response to receiving the request packet at the load balancing server, the load balancing server decrypting information in the request packet and then routing and load balancing the request packet, with the decrypted information, to a back end Web server among a cluster of back end Web servers, wherein the back end Web server's response packet to the request packet is received at the load balancing server, the response packet containing at least one portion of an outgoing markup language page; and in response to receiving the response packet with the at least one portion of the outgoing markup language page at the load balancing server, the load balancing server parsing the at least one portion of an outgoing markup language page in the response packet to identify content served by a content delivery network, modifying one or more URLs for the content in the at least one portion of the markup language page so that the content is served from the content delivery network in response to requests from requesting clients, and sending the response packet to the requesting client such that the response packet does not go through the scheduler;

wherein the scheduler and the load balancing server that perform the steps recited herein each comprise a computer hardware device.

2. The method of claim 1, wherein the scheduler routes and load balances client request packets to itself.

3. The method of claim 1, further comprising: determining by the load balancing server, a MAC address of the back end Web server; changing a MAC address in the request packet to the MAC address of the back end Web server.

4. The method of claim 1, further comprising: detecting failure of the scheduler; and electing a load balancing server among the load balancing array of servers as a new scheduler.

5. The method of claim 1, wherein the scheduler detects failure of load balancing servers among the load balancing array of servers, and wherein the scheduler stops routing packets to failed load balancing servers.

6. The method of claim 1, wherein the load balancing server schedules sessions to back end Web servers based on a cookie or session ID.

7. The method of claim 1, wherein the load balancing server uses cookie injection to map a client to a specific back end Web server.

8. A system of load balancing servers interconnected across a network in a computer environment, the system comprising:

a scheduler among a load balancing array of servers that is programmed to, in response to receiving a request packet from a requesting client via an IP address, route and load balance the request packet to a load balancing server among the load balancing array of servers;

the load balancing server among the load balancing array of servers is programmed to, in response to receiving the request packet, decrypt information in the request packet and then route and load balance the request packet, with the decrypted information, to a back end Web server among a cluster of back end Web servers, wherein the back end Web server's response packet to the request packet is received at the load balancing server, the response packet containing at least one portion of an outgoing markup language page; and the load balancing server is programmed to, in response to receiving the response packet with the at least one portion of the outgoing markup language page, parse the at least one portion of an outgoing markup language page in the response packet to identify content served by a content delivery network, modify one or more URLs for the content in the at least one portion of the markup language page so that the content is served from the content delivery network in response to requests from requesting clients, and send the response packet to the requesting client such that the response packet does not go through the scheduler;

the scheduler, the load balancing server, and the back end Web server each comprise one or more hardware processors and computer memory holding computer program instructions for execution by the one or more hardware processors.

9. The system of claim 8, wherein the scheduler is programmed to route and load balance client request packets to itself.

10. The system of claim 8, further comprising:
a logic, at the load balancing server, that determines a MAC address of the back end Web server; a logic, at the load balancing server, that changes a MAC address in the request packet to the MAC address of the back end Web server.

11. The system of claim 8, further comprising:
a logic, at the load balancing server, that detects failure of the scheduler; and a logic, at the load balancing server, that elects a load balancing server among the load balancing array of servers as a new scheduler.

12. The system of claim 8, wherein the scheduler is programmed to detect failure of load balancing servers among the load balancing array of servers, and wherein the scheduler is programmed to stop routing packets to failed load balancing servers.

13. The system of claim 8, wherein the load balancing server is programmed to schedule sessions to back end Web servers based on a cookie or session ID.

14. The system of claim 8, wherein the load balancing server is programmed to use cookie injection to map a client to a specific back end Web server.

* * * * *